United States Patent [19]

Holmberg et al.

[11] Patent Number: 4,621,308
[45] Date of Patent: Nov. 4, 1986

[54] TACKLE BOX WITH LIGHT UNIT ASSEMBLY

[75] Inventors: Rodney D. Holmberg, 1365 Gentry Ave., N., Oakdale, Minn. 55119; Brian K. Bolstad, Oakdale, Minn.

[73] Assignee: Rodney D. Holmberg, Stacy, Minn.

[21] Appl. No.: 570,764

[22] Filed: Jan. 16, 1984

[51] Int. Cl.⁴ .................. F21V 33/00; B65D 85/20
[52] U.S. Cl. ............................... 362/154; 362/207; 362/307; 362/310; 362/311; 206/315.1; 312/DIG. 33; D3/38
[58] Field of Search ............. 362/154, 155, 156, 802, 362/208, 157, 207, 307, 310, 311; 206/315.11, 315.1; 312/DIG. 33; D3/38

[56] References Cited

U.S. PATENT DOCUMENTS

| D. 158,368 | 5/1950 | Felts et al. | D3/38 |
| 1,531,288 | 3/1925 | Johnston | 362/156 |
| 1,882,756 | 10/1932 | Boynton | 206/315.11 X |
| 2,290,419 | 7/1942 | Dunn | 362/156 |
| 2,517,914 | 8/1950 | Nowaczek | 362/156 |
| 2,751,489 | 6/1956 | Cole | 362/156 |
| 2,801,330 | 7/1957 | Gay | 362/156 |
| 3,265,880 | 8/1966 | Whitman | 362/207 |
| 3,404,267 | 10/1968 | Zucker | 362/156 |
| 3,490,169 | 1/1970 | Tweed | D3/38 |
| 3,938,132 | 2/1976 | Cunningham | 340/321 |
| 4,149,223 | 4/1979 | Moberly | 362/156 |

Primary Examiner—Deborah L. Kyle
Assistant Examiner—John S. Maples
Attorney, Agent, or Firm—Anthony G. Eggink

[57] ABSTRACT

The self contained light unit is for use with a fishing tackle box having a movable tray assembly. The light unit consists of a thin, rectalinear housing having flat top and bottom portions and opposing side portions. The bottom portion has a transparent sheet structure and a lip for slidably receiving it. The housing further has a reflective sheet portion disposed therein and at least one light source located between the reflective sheet and transparent sheet for illuminating predetermined portions of the tackle box. A power source is placed within the housing, and the housing has access to the power source. A switch is located outside the housing, and hinges are attached to the opposing side portions of the housing and to the sides of the tray unit. The hinges are constructed to provide a predetermined angular placement of the light unit as it is opened so that the light is directed to predetermined portions of the tackle box to aid the fisherman in locating the tackle therein.

5 Claims, 6 Drawing Figures

TACKLE BOX WITH LIGHT UNIT ASSEMBLY

BACKGROUND OF THE INVENTION

This invention relates to a light unit assembly for use with storage containers. Particularly, this invention relates to an enclosed, self contained light unit for use with fishing tackle boxes having foldable tray assemblies.

Light unit assemblies according to the invention are useful for providing a directed light source to the interior portions of a fishing tackle box, as well as to areas in its immediate proximity. The light unit assemblies provide a fisherman, or the like, with a light source to enable the location, during times of darkness, of the tackle and other items stored in the box, and to provide a light source for purposes of utilizing the items located. Tackle boxes equiped with light units according to the teachings of this invention provide fishermen with a tackle box which is effective during night fishing without compromising its use during daylight hours.

In the past, various types and styles of lighted storage and tackle boxes or containers have been proposed. However, the ability of, particularly, fisherman to utilize these tackle boxes during the course of night fishing has continued to be effectively unmet.

For example, prior art lighted tackle boxes have been proposed having complex and costly lighting mechanisms, having light unit elements within the interior of the box itself, having difficult to operate switches, having non-adjustable lights, and having lights which only partially illuminate the tackle box. Thus, these lighting devices have been difficult and limited in use, complex in construction, ineffective and costly. The light unit assemblies of this invention overcome the shortcomings and limitations of these prior art lighting devices, and none in so far as is known has been proposed or developed.

A practical, effective and self contained light unit, having no extraneous wires or power sources located in the tackle box itself is provided by the teachings of this invention. Additionally, the lighting unit upon the opening of the box will align itself in a desired position. And, the trays of the tackle box are designed so that they cooperate with the light unit to permit the light to shine through tray portions and into predetermined areas of the tackle box for illuminating the needs of the fisherman.

SUMMARY OF THE INVENTION

The light unit is for use with a fishing tackle box having at least one upwardly and outwardly movable tray assembly mounted thereto. The light unit is comprised of a generally thin, rectalinear housing having a flat top and bottom portion, and opposing side portions. The bottom portion has a transparent sheet structure and lip means for receiving the sheet structure. The housing further has a reflective sheet portion disposed therein, and it has at least one light source disposed between the reflective sheet and the transparent sheet for illuminating predetermined portions of the tackle box.

A power source is disposed within the housing at a location between the reflective sheet and the top portion of the housing which further has access means to the power source. A switch communicates with the power source and the light source and is accessible external the housing.

Hinges are communicatively attached to the opposing side portions of the housing and to the sides of the movable tray of the tackle box. The hinges are disposed to permit the slidable removal of the transparent sheet from the lip of the housing and further are disposed to provide a predetermined angular disposition of the housing with respect to the tackle box as the tray is moved upwardly and outwardly, whereby, a fisherman is provided with a light source directed to predetermined portions in the tackle box as the tray unit is moved for use.

Additionally provided by the teachings of this invention is a power source comprised of batteries which are wired to extend battery life. And, provided are tray unit assemblies for use with light units which have predetermined reflective and transparent portions to maximize the effective light emitted into the tackle box. Also provided is a tray unit assembly having an upper tray with a fishing line cutting notch located within the light emmission area of the light unit. Finally, light unit housings and hinges are provided designed for transparent sheet removal, and for easy power source and switch accessibility.

These and other benefits of this invention will become clear from the following description, by reference to the drawings.

DESCRIPTION OF THE PREFERRED EMBODIMENTS

Figure 1:
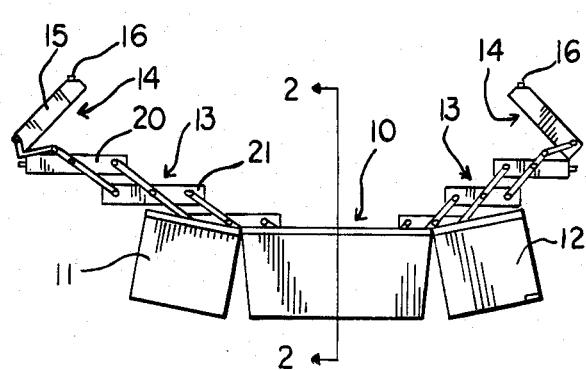
FIG. 1 is a schematic side plan view showing the light unit assembly of the invention used in combination with a tray assembly of a fishing tackle box.

Referring to FIG. 1, a fishing tackle box 10 is shown as having top covers 11 and 12 which open outwardly. The tackle box 10 has a pair of hinged tray assemblies 13 which are movable in an upward and outward manner, as is common in many tackle box designs. Although a tackle box 10 is here shown as having a pair of opposing hinged tray assemblies 13 with upper trays 20 and lower trays 21, the light unit assembly 14 is as easily usable with smaller tackle boxes having merely one such tray assembly or having a different number of individual trays.

Figure 2:
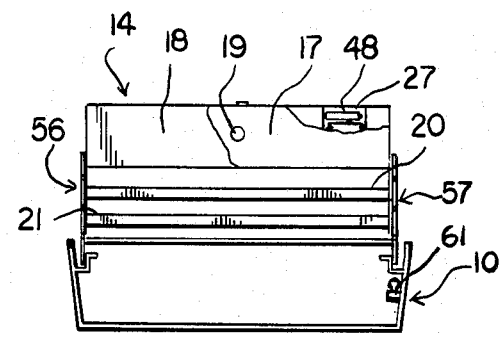
FIG. 2 is a cross sectional view of the tackle box with light unit assembly of FIG. 1 taken on line 2—2 thereof.

The light unit assemblies 14 are shown hingedly secured to the upper tray 20 of the tray assemblies 13 by means of opposing hinge assemblies 56 and 57 (FIG. 2). The light unit assembly 14 is comprised of a generally thin, reactalinear housing 15 which has a switch 16, externally accessible to the fisherman which permits the activating of the batteries and lights that are contained in the unit 14 itself, as will be further described. The hinge means, as will also be later described, from the light unit 14 to the uppermost tray 20 is such that the unit 14 preferably locks in a predetermined position to direct the light into predetermined portions of tackle box 10.

FIG. 2 is a cross sectional view of tackle box 10 and it also is a cutaway of the light unit assembly 14. The light unit 14 is shown to have a transparent plastic cover 18 behind which is a reflective surface 17. A bulb 19 is shown extending through the reflective surface 17 and behind this surface an opening 27 is shown for receiving the power source. A battery 48 is shown placed in the opening 27, which is accessible from the top of the light unit housing 15. As will be further described, the power source is preferably comprised of four batteries, although any other power source or any number of batteries can be utilized. Additionally, although one bulb 19 is illustrated, any desired number of bulbs or any type, whether incandescent or fluorescent lamps can be utilized. The importance being that the light unit 14 be a self contained and enclosed entity. For convenience, a spare bulb holder 61 is shown mounted to the interior of the tackle box 10. The holder 61 can be a typical bulb socket fastened to the interior wall portion at a safe location to minimize the chance of bulb breakage.

Figure 3:
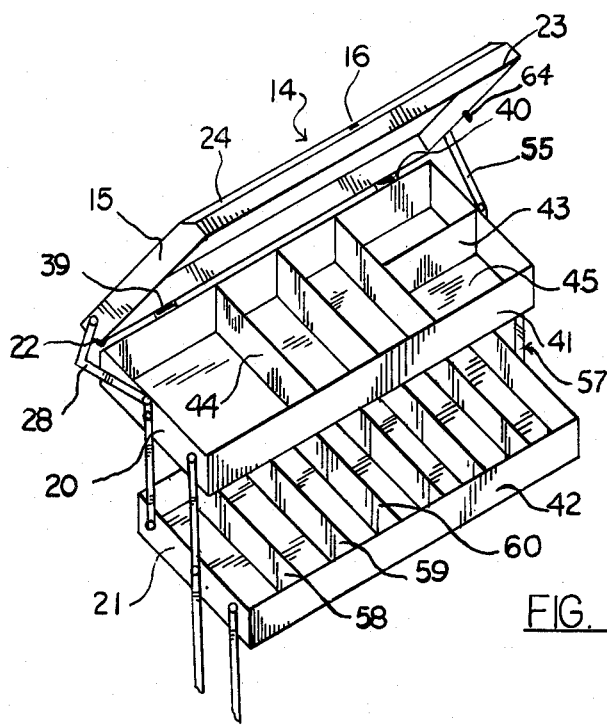
FIG. 3 is a schematic perspective view of the tray assembly of a tackle box having the enclosed light unit assembly of this invention mounted to its uppermost tray.

FIG. 3 is a perspective view of a tray assembly 13 having trays 20 and 21. It shows certain portions of the tray assembly being comprised of reflective and transparent portions to direct the light from light unit 14 to predetermined areas of the tray assembly 13 and into the tackle box 10. The frontal tray portions 41 and 42 of upper and lower trays 20 and 21, respectively, are constructed of a clear, transparent material, such as an impact resistent plastic, to permit the light from light unit 14 to pass therethrough. Additionally, tray dividers 43 and 44 of the upper tray 20 and tray dividers of 58, 59 and 60 of lower tray 21 are also constructed of this transparent material. Obviously, the tray dividers can be placed in any desired configuration, and the number of individual trays in the tray assembly can be of any desired number.

Figure 4:
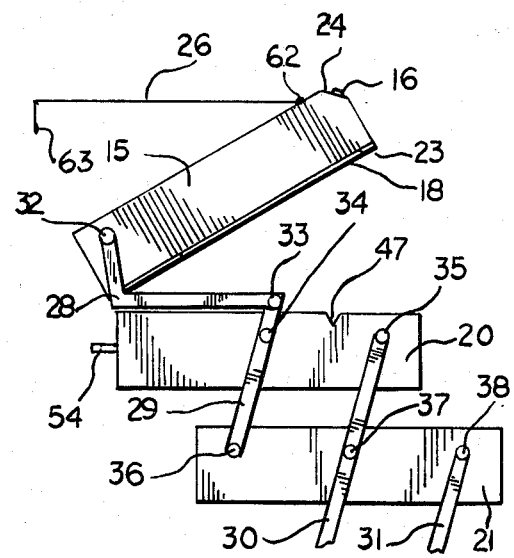
FIG. 4 is a schematic side plan view of the light unit assembly of this invention hinged to the upper tray of a tray assembly of a fishing tackle box.

The other areas of the individual trays, such as their respective bottoms portions 45 and 46 are preferably constructed of a white plastic or other light colored material, for example, to reflect the light to desired areas of the box 10. Additionally as shown in FIG. 4, a line cutter notch 47 is disposed in the side portion of upper tray 20, located within the lighted area, to permit a fisherman to cut fishing line. This V-shaped notch 47 could obviously be located at other portions of the tray assembly 13. Depending upon the construction of the tray unit side portion, the notch 47 consists of a V-shaped indention into the tray side or it consists of a notch having a metallic insert mounted thereinto which may be better suited for cutting fishing line.

FIG. 3 also shows hinge 28 between the side of housing 15 of light unit 14 to the top tray 20, which in conjunction with hinges 39 and 40, attach for rotating the light unit 14 to the rear of top tray 20, and which lock the light unit in a predetermined position as the tray assembly 13 is moved in an upward and outward manner so that the unit 14 lights generally the entire box 10 area and areas in its immediate proximity. Optionally, the rear hinges 39 and 40 are eliminated so that a fisherman is able to manually adjust the angular disposition of the light unit to any desired angle, i.e., to an area exterior to tackle box 10. Optionally, the hinges 39 and 40 are eliminated and a stop member is attached to the bottom outward portion of light unit 14 so that the unit can be placed in the predetermined angular position. FIG. 3 also illustrates a pin switch 64 which is aligned to contact a top side portion of upper tray 20. The switch 64 is optionally provided to have the light unit 14 operate automatically as it is moved to and from the top tray 20 of tray assembly 13.

Figure 5:
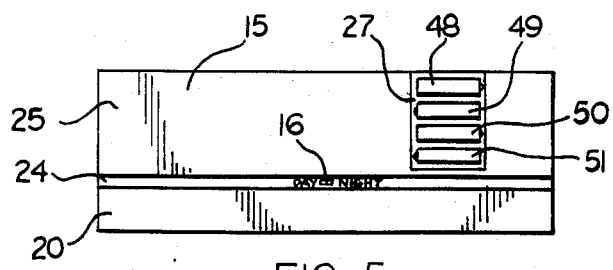
FIG. 5 is schematic top plan view of the light unit assembly showing the power source located therein.

FIG. 4 illustrates a side view of the light unit assembly 14 mounted to the top tray 20 of tray assembly 13. As shown, the light unit housing 15 has, at its frontal portion a sloping, diagonal portion 24 wherein the switch 16 is located. This configuration protects the switch 16 from being damaged and from being accidentally bumped to an "on" or "off" position. It is preferable that the switch 16 has markings of "day" and "night" rather then the the traditionally used "off" and "on", as shown in FIG. 5.

FIG. 4 also illustrates a power source access cover 26 in an opened position which permits the fisherman access to the power supply located within housing 15. The cover 26 has a hinge member 62 and a closure member 63 so that the access cover 26 is flush with the light unit housing 15 when in a closed position. Also shown are a pair of downwardly extending lips 22 and 23 from the sides of housing 15 permit the transparent sheet member 18 to be slidably removed from the housing 15 so that the fisherman is able to gain access to the light bulb(s) located behind it. Hinge 28 is shown to have an angularly (i.e., 100 degrees for a three tray assembly so that the light unit when in its most expanded postion is disposed at an angle of 60 degrees for properly lighting the interior portions of box 10) two legged configuration which permits the sheet member 18 to be removed from lips 22 and 23. And, preferably a grip handle 54 is fastened to the outside of the top tray 20 to permit the fisherman to open the tray assembly in an upward and outward manner.

Rivoted members, or the like, identified as 32, 33, 34, 35, 36, 37, and 38 permit the respective hinges 28, 29, 30 and 31 to rotationally move with respect thereto as the tray assembly 13 is moved from and to the tackle box 10. The hinge members 29, 30 and 31 are generally utilized in the tackle box industry for this purpose. However, the interaction of hinge 28 with respect to hinge 29 is provided by this invention to result in a predetermined position of the light unit 14 as the tray assembly is moved to and from its collapsed storage position. Optionally, hinge 28 can be of a straight configuration if the lips that receive the sheet member 18 are located along the bottom sides of the housing 15. And, as can be appreciated, it is possible to permanantly fix, or to hingedly fix sheet 18 to the bottom of housing 16 as long as the fisherman is provided with means to access the interior of housing 15 in order to perform necessary maintenance, such as the changing of bulb(s) 19. Although hinges are shown in the drawings and described herein with respect to only one side of the tray assembly 13 and light unit 14, it is obvious that similarly disposed hinges and rivot members are placed on the opposite sides thereof. Only with respect to the angularly disposed hinge 28 is this not true because only one such hinge is necessary to remove the transparent sheet 18 from lips 22 and 23. In other words, one angular hinge 28 and one straight hinge 55 of hinge assembly 57 can be utilized in conjunction with light unit 14.

As is shown in FIG. 4 of the drawings, the hinge 29 has an upper extended portion between rivots 33 and 34. Additionally, the L-shaped hinge 28 is connected at one end to the upper end of the extended portion by rivot 33. Thus, as the light unit 15 is moved in an upward and outward direction, hinge 28 is rotated at rivot 33 with respect to the extended portion of hinge 29. The axis of rotation is about rivot 33. As is further shown in FIGS. 1, 3 and 4, the light unit is disposed at a predetermined angle with respect to upper tray 20 as is also described above.

Figure 6:
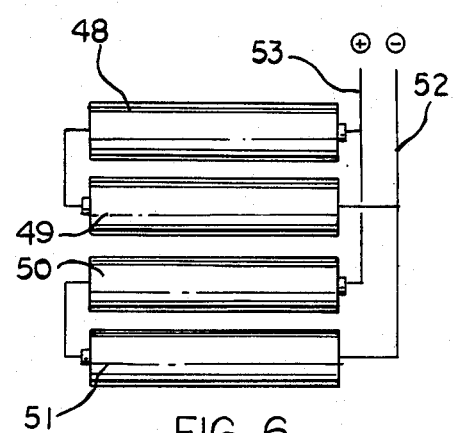
FIG. 6 is a schematic diagram which shows the circuitry of the battery power source for the light unit assembly of this invention.

FIG. 5 shows a top view of the housing 15 having a top portion 25 with an opening 27 wherein the power source batteries are located. FIG. 6 illustrates a schematic diagram which illustrates the batteries 48, 49, 50 and 51 as being wired in series with respect to battery pairs 48 and 49, and 50 and 51. However, these respective pairs are then wired in parallel to preserve battery life, as can be appreciated to those skilled in the art. The batteries are preferably of a 1.5 volt penlight type to minimize the weight as well as the space requirement in light unit housing 15. It is preferable to maintain the light unit 14 in as thin as possible configuration so that valuable space is not unnecessarily taken up in the top covers 11 and 12 of tackle box 10.

As shown and described above, the light unit of this invention is a self contained, enclosed unit, in that all of the functional elements, such as lights, power source, wiring, etc. are provided for use within the housing 15 itself. Thus, no extraneous materials are found elsewhere in the tackle box 10. And, it has also been found preferable to have the interior portion of the tackle box 10 housing painted or constructed of a light reflective material to enhance the effect of the light unit 14.

Although the light unit 14 is shown in the drawings as being used with a tray assembly 13 of a tackle box 10, it is within the purview of the invention to utilize the light unit 14 with tackle boxes having a plurality of such tray units, tray units having one or more individual trays, or tackle boxes having no movable tray unit assemblies at all. In the latter case, the light unit would obviously be mounted to the top of the box 10 housing or be mounted in one or both of the covers 11 and 12 of tackle box 10.

As many changes are possible to the embodiments of this invention, utilizing the teachings thereof, the description above, and the accompanying drawings, should be interpreted in the illustrative and not in the limited sense.

That which is claimed is:

1. In combination, a self container light unit and a fishing tackle box having at least one upwardly and outwardly movable tray assembly including individual trays, said light unit comprising:

(a) a generally thin, rectalinear housing having generally flat top and bottom portions, opposing side portions, and a front and rear portion, said bottom portion having a transparent sheet structure for the emission of light therethrough, said housing further having a reflective sheet portion disposed therein, and having at least one light source disposed between said reflective sheet and said transparent sheet for illuminating predetermined portions of said tackle box, said housing further having a frontal sloping diagonal portion extending downward from the top thereof and having an aperture therein, (b) power source means disposed within said housing at a location between said reflective sheet and said top portion of said housing, said housing further having access means thereinto for access to said power source, (c) switch means communicating with said power source means and said light source and being accessible external said housing through said aperture in said sloping diagonal portion of said housing, (d) hinge means communicatively attached to said opposing side portions of said housing and to the movable tray assembly of the tackle box, said hinge means being disposed to provide a predetermined angular disposition of said housing of approximately 60 degrees with respect to the tackle box as the tray is moved upwardly and outwardly, and (e) tray unit assembly portions comprised of bottom members, front edges and compartment dividers and said front edges and said compartment dividers comprised of light transparent material, whereby, a fisherman is provided with a light source directed to predetermined portions in the tackle box as the tray unit is moved therefrom, and wherein the light is directable to the predetermined portions by means of the transparent and reflective portions of the tray assembly.

2. The light unit, tackle box combination of claim 1, wherein at least one of said tray unit side edges has a sharpened notch disposed at its top for cutting fishing line.

3. The light unit, tackle box combination of claim 1, wherein said housing of said light unit has opposing lip portions extending from said front and rear portions to slidably receive said transparent sheet structure.

4. The light unit, tackle box combination of claim 1, wherein said power source is comprised of four 1.5 volt batteries, and wherein said four batteries are wired two in series to form two pairs, and wherein the pairs in series are wired in parallel to extend battery life.

5. The light unit, tackle box combination of claim 1, wherein said tackle box further has a light reflective interior, and wherein a spare bulb holder is mounted to the interior thereof.

* * * * *